United States Patent Office 3,754,048
Patented Aug. 21, 1973

3,754,048
DIENE POLYMERIZATION
Ching Yong Wu, Pittsburgh, and Harold E. Swift, Gibsonia, Pa., assignors to The B. F. Goodrich Company
No Drawing. Filed Dec. 27, 1971, Ser. No. 212,733
Int. Cl. C07c 3/10
U.S. Cl. 260—680 B          7 Claims

ABSTRACT OF THE DISCLOSURE

Conjugated dienes are reacted to polymers (oligomers) of low molecular weight by contacting with a catalyst system consisting of chromium(III) acetylacetonate, trialkyl aluminum and a Schiff-base ligand.

CROSS-REFERENCES TO RELATED APPLICATIONS

This invention is specific in the use of chromium(III) acetylacetonate in a three-component catalyst system for the oligomerization of conjugated dienes. Other catalysts using Ni(II) acetylacetonate in the cyclotrimerization of butadiene-1,3 (hereinafter butadiene) and Fe(III) acetylacetonate in the cyclodimerization of 1,3-dienes are described in copending applications, respectively, Ser. Nos. 212,726 and 212,623, both filed Dec. 27, 1971.

BACKGROUND OF THE INVENTION

Field of the invention

This invention relates to the preparation of oligomers. Oligomers are polymeric materials containing a relatively small number of monomer units, i.e., from 2 to about 100. By contrast, high polymers such as, e.g., natural rubber, polybutadiene rubbers and the like, may contain well in excess of 10,000 monomer units.

Oligomers are prepared by the method of the present invention by contacting a conjugated diene with a highly specific three-component catalyst system. Materials thus prepared are useful in, e.g., metal-coating and adhesive formulations.

Description of the prior art

Methods heretofore employed in the preparation of low-molecular-weight polymers of conjugated dienes have employed expensive catalyst systems or multi-stage processing in order to separate out undesired by-products. The method of the present invention employs catalysts of moderate costs, and the reaction produces few by-products; those which are produced are easily separated from the desired reaction product.

The system employed by Bozik et al. in U.S. Pat. 3,565,875 contains a related, but not identical, ligand, and uses an iron complex where the present invention uses specifically chromium(III) acetylacetonate.

Other catalyst systems similar to the present invention have produced intermediate and high polymers, but have been unsuccessful in preparing oligomers.

SUMMARY OF THE INVENTION

Conjugated dienes are reacted to polymers of relatively low molecular weight by contacting with a catalyst consisting of chromium(III) acetylacetonate, a trialkyl aluminum and a Schiff base as a ligand-donating compound. The Schiff base is the condensation product of an aryl aldehyde or ketone with an aniline-family compound. The polymers produced by the method of this invention are low in molecular weight, with polymer chain lengths not greater than about 100 monomer units, the average being between about 5 and about 25 monomer units.

DESCRIPTION OF THE PREFERRED EMBODIMENTS

The preferred embodiment of the present invention is the method for preparing oligomers of 1,3-conjugated dienes which comprises contacting at least one of said dienes with a catalyst consisting of (1) chromium(III) acetylacetonate,
(2) a trialkyl aluminum in which each alkyl group contains from 1 to 8 carbon atoms, and
(3) a Schiff base characterized by the structural formula

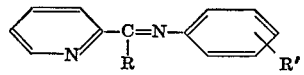

where R is hydrogen or phenyl and R' is hydrogen or alkyl from 1 to 6 carbon atoms, at a temperature between about −50 and about 150° C., wherein the chromium(III) acetylacetonate, trialkyl aluminum and Schiff base are present in the ratio of about 1/2.5/0.5 to 1/3.5/1.1, and thereafter recovering said oligomers.

While a solvent or diluent is not necessary for the operation of the present invention, it is generally convenient to handle the catalyst components in an inert hydrocarbon medium. It should be noted, however, that the solvent must be inert, i.e., contain no functional groups such as e.g., chloro, hydroxyl, alkoxy, and the like. Aliphatic, aromatic and cycloaliphatic hydrocarbons are preferred solvent-diluents for use in the method of this invention.

Recovery of the oligomer is done by means well known to those skilled in the art, such as e.g., treatment with dilute acid or alcohol to inactivate the catalyst, followed by distillation, or solvent extraction of the product and subsequent removal of the solvent.

The trialkyl aluminums employed are preferably those with from 2 to 4 carbon atoms on each alkyl group, with triethyl aluminum and triisobutyl aluminum being most preferred.

Of the Schiff-base ligands, those derived from the reaction of a pyridine aldehyde or ketone compound with aniline or toluidine are preferred, while most preferred are α-(2-pyridiyl)benzylidene-p-toluidine (PBT),

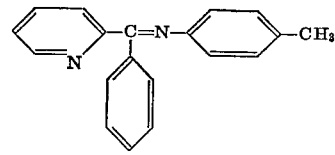

α-(2-pyridyl)benzylidene aniline (PBA),

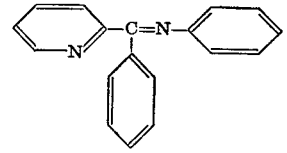

and 2-picolylidene aniline (2PA),

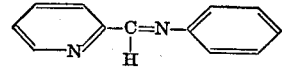

The 1,3-dienes polymerized by the method of the present invention are those containing from 4 to 8 carbon atoms, with butadiene, 2-methyl butadiene-1,3 (isoprene), pentadiene-1,3 (piperylene) and 2-ethyl butadiene-1,3 being preferred.

It has been found that the ratios of the catalyst components are critical within fairly narrow limits. The chromium/aluminum/ligand ratio must be kept within the range of about 1/2.5/0.5 to about 1/3.5/1.1. Substantial variation from these limits can result in a failure of the desired reaction.

The polymerization is accomplished by contacting at least one conjugated diene with the catalyst system at a temperature between about −50 and about 150° C., and thereafter recovering the desired polymer. A reaction temperature of about 0 to about 125° C. is preferred, with the range of from about 10 to 110° C. being most preferred.

It is essential to the practice of the present invention that oxygen and water be excluded; accordingly, the reaction is preferably accomplished under nitrogen pressure, or the reactants and catalyst are introduced into an evacuated vessel, and the oligomer is prepared under the vapor pressure of the materials in the reaction system. Reaction-system pressure does not affect the chain length of the oligomer produced.

The following examples are intended as illustrative only of the method of the present invention, and the effects of varying the parameters thereof both within the scope of the invention, and beyond its limits.

EXAMPLE 1

A clean, dry 200-milliliter (ml.) pressure bottle is purged of atmospheric oxygen by flushing with dry nitrogen. To the bottle are then added 1 millimole (mmol) chromium(III) acetylacetonate, 1 mmol PBA, 50 ml. benzene, 200 mmol butadiene and finally 3 mmol triethyl aluminum. The bottle is sealed and the reaction is heated to 100° C., with agitation. After 24 hours, the catalyst is destroyed by the addition of 0.5% HCl in methanol, and the product is recovered by extraction with benzene, followed by removal of the benzene by distillation. A thick liquid polybutadiene is recovered in 90% yield. Analysis by conventional methods such as, e.g., gel-permeation chromatography, shows the major part of the product with a molecular weight range from about 300 to about 1400, corresponding to oligomers with chain lengths of from about 5 or 6 to about 25 monomer units. Less than 10% of the product has a molecular weight range between about 1400 and about 5500, corresponding to chain lengths of about 25 to about 100 monomer units.

EXAMPLE 2

The conditions of Example 1 are repeated, using isoprene in place of butadiene. A liquid polyisoprene is recovered in 82% yield. The product is about 85% low-molecular-weight polymer of from about 5 to 25 or 30 monomer units. Of the remaining 15%, the major portion is on the low end of the range of from about 30 to 100 monomer units.

EXAMPLE 3

The conditions of Example 1 are repeated, using PBT in place of the PBA, and pentadiene-1,3 (piperylene) in place of the butadiene. A thick liquid polymer is recovered in 78% yield. Polymer chain lengths are found to be substantially similar to the results of Example 2.

EXAMPLE 4

The conditions of Example 1 are repeated, using diethyl aluminum chloride in place of triethyl aluminum. No reaction occurs. This example illustrates the specificity of the trialkyl aluminum.

EXAMPLE 5

In order to determine the effect of catalyst-reactive compounds on the reaction of the present invention, Example 1 is repeated using 2-ethylhexyl alcohol as the solvent. No reaction occurs.

EXAMPLE 6

The criticality of the component ratio is shown by repeating the conditions of Example 1 with 1.0 mmol triethyl aluminum. No reaction occurs.

We claim:

1. The method for preparing oligomers of 1,3-conjugated dienes which comprises contacting at least one of said dienes with a catalyst consisting of
   (1) chromium(III) acetylacetonate,
   (2) a trialkyl aluminum in which each alkyl group contains from 1 to 8 carbon atoms, and
   (3) a Schiff base characterized by the structural formula

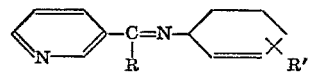

where R is hydrogen or phenyl and R' is hydrogen or alkyl from 1 to 6 carbon atoms, wherein said chromium(III) acetylacetonate, trialkyl aluminum and Schiff base are present in the ratio of from about 1/2.5/0.5 to about 1/3.5/1.1, at a temperature of from about −50 to 150° C., and recovering said oligomer.

2. The method of claim 1 wherein said diene contains from 4 to 10 carbon atoms and each alkyl group of said trialkyl aluminum contains from 2 to 4 carbon atoms.

3. The method of claim 1 wherein said diene is selected from the group consisting of butadiene and isoprene, and said trialkyl aluminum is selected from the group consisting of triethyl aluminum and triisobutyl aluminum, at a temperature of from about 10 to about 130° C.

4. The method of claim 1 wherein said Schiff base is selected from the group consisting of α-(2-pyridyl)benzylidene aniline, α-(2-pyridyl)benzylidene toluidine, and 2-picolylidene aniline.

5. The method of claim 1 wherein the preparation of said oligomer is done in an inert hydrocarbon medium.

6. The method of claim 1 wherein said diene is butadiene.

7. The method of claim 1 wherein said diene is isoprene.

References Cited
UNITED STATES PATENTS

| | | | |
|---|---|---|---|
| 3,390,196 | 6/1968 | Chappell et al. | 260—666 B |
| 3,326,990 | 6/1967 | Clark | 260—666 B |
| 3,542,887 | 11/1970 | Hillegass et al. | 260—666 B |
| 3,651,065 | 3/1972 | Yagi et al. | 260—270 |

PAUL M. COUGHLAN, Jr., Primary Examiner

U.S. Cl. X.R.

252—431 N